(12) United States Patent
Samadani et al.

(10) Patent No.: US 12,230,173 B2
(45) Date of Patent: *Feb. 18, 2025

(54) IMAGE ENHANCEMENT DEVICES WITH GAZE TRACKING

(71) Applicant: Apple Inc., Cupertino, CA (US)

(72) Inventors: Ramin Samadani, Menlo Park, CA (US); Christina G. Gambacorta, Santa Cruz, CA (US); Elijah H. Kleeman, San Jose, CA (US); Nicolas P. Bonnier, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/479,965

(22) Filed: Oct. 3, 2023

(65) Prior Publication Data

US 2024/0029598 A1    Jan. 25, 2024

Related U.S. Application Data

(63) Continuation of application No. 16/927,796, filed on Jul. 13, 2020, now Pat. No. 11,810,486, which is a
(Continued)

(51) Int. Cl.
*G09G 3/00* (2006.01)
*G02B 27/00* (2006.01)
(Continued)

(52) U.S. Cl.
CPC ............. *G09G 3/001* (2013.01); *G02B 27/00* (2013.01); *G02B 27/017* (2013.01);
(Continued)

(58) Field of Classification Search
CPC .......... G06F 3/012; G06F 3/013; G06F 3/017; G02B 27/00; G02B 27/0017;
(Continued)

(56) References Cited

U.S. PATENT DOCUMENTS 5,731,805 A    3/1998 Tognazzini et al.
6,078,310 A    6/2000 Tognazzini
(Continued)

FOREIGN PATENT DOCUMENTS

CN    103814343 A    5/2014
CN    104918572 A    9/2015
CN    107003521 A    8/2017

*Primary Examiner* — Tom V Sheng
(74) *Attorney, Agent, or Firm* — Treyz Law Group, P.C.; G. Victor Treyz; Jinie M. Guihan

(57) ABSTRACT

An electronic device may have a display and a camera. Control circuitry in the device can gather information on a user's point of gaze using a gaze tracking system and other sensors, can gather information on the real-world image such as information on content, motion, and other image attributes by analyzing the real-world image, can gather user vision information such as user acuity, contrast sensitivity, field of view, and geometrical distortions, can gather user input such as user preferences and user mode selection commands, and can gather other input. Based on the point-of-gaze information and/or other gathered information, the control circuitry can display the real-world image and supplemental information on the display. The supplemental information can include augmentations such as icons, text labels, and other computer-generated text and graphics overlaid on the real world image and can include enhanced image content such as magnified portions of the real-world image.

20 Claims, 5 Drawing Sheets

Related U.S. Application Data continuation of application No. 16/280,786, filed on Feb. 20, 2019, now Pat. No. 10,747,312.

(60) Provisional application No. 62/643,023, filed on Mar. 14, 2018.

(51) Int. Cl.

| | | |
|---|---|---|
| *G02B 27/01* | (2006.01) | |
| *G06F 3/01* | (2006.01) | |
| *G06T 3/40* | (2006.01) | |
| *G06T 7/20* | (2017.01) | |
| *G06T 19/00* | (2011.01) | |
| *G06V 20/20* | (2022.01) | |
| *G06V 40/16* | (2022.01) | |
| *G06V 40/18* | (2022.01) | |
| *G06T 5/90* | (2024.01) | |
| *G06T 11/00* | (2006.01) | |

(52) U.S. Cl.
CPC ......... *G02B 27/0179* (2013.01); *G06F 3/012* (2013.01); *G06F 3/013* (2013.01); *G06F 3/017* (2013.01); *G06T 3/40* (2013.01); *G06T 7/20* (2013.01); *G06T 19/006* (2013.01); *G06V 20/20* (2022.01); *G06V 40/172* (2022.01); *G06V 40/193* (2022.01); *G02B 2027/011* (2013.01); *G02B 2027/0112* (2013.01); *G02B 2027/0118* (2013.01); *G02B 2027/0138* (2013.01); *G02B 2027/014* (2013.01); *G02B 2027/0187* (2013.01); *G06T 5/90* (2024.01); *G06T 11/001* (2013.01); *G06T 2207/20192* (2013.01); *G09G 2320/0626* (2013.01); *G09G 2320/066* (2013.01); *G09G 2320/0686* (2013.01); *G09G 2354/00* (2013.01)

(58) Field of Classification Search
CPC ............ G02B 27/0179; G02B 27/0093; G02B 2027/011; G02B 2027/0112; G02B 2027/0118; G02B 2027/0138; G02B 2027/014; G02B 2027/0187; G06K 9/00288; G06K 9/00671; G06K 2209/01; G06T 3/40; G06T 7/20; G06T 19/006; G06T 5/007; G06T 5/90; G06T 11/001; G06T 2207/20192; G09G 3/001; G09G 2320/0626; G09G 2320/066; G09G 2320/0686; G09G 2354/00; G06V 20/20; G06V 40/172; G06V 40/193; G06V 30/10
USPC .......................................................... 345/156
See application file for complete search history.

(56) References Cited

U.S. PATENT DOCUMENTS

| | | |
|---|---|---|
| 6,127,990 A | 10/2000 | Zwern |
| 9,197,864 B1 | 11/2015 | Starner et al. |
| 9,442,644 B1 | 9/2016 | Bostick |
| 9,632,579 B2 * | 4/2017 | Kim ........................ G06T 1/20 |
| 9,965,062 B2 | 5/2018 | Sala |
| 10,372,206 B2 | 8/2019 | Li et al. |
| 10,747,312 B2 * | 8/2020 | Samadani ............ G06V 40/172 |
| 11,768,376 B1 * | 9/2023 | Pedder ............... G02B 27/0179 |
| | | 345/694 |
| 11,810,486 B2 * | 11/2023 | Samadani ............ G02B 27/017 |
| 2006/0007396 A1 | 1/2006 | Clement |
| 2009/0040461 A1 | 2/2009 | Efron et al. |
| 2011/0157221 A1 | 6/2011 | Ptucha et al. |
| 2011/0254865 A1 * | 10/2011 | Yee ..................... G06F 3/04886 |
| | | 345/661 |
| 2012/0176410 A1 | 7/2012 | Meier et al. |
| 2013/0120161 A1 | 5/2013 | Wakabayashi et al. |
| 2013/0178257 A1 * | 7/2013 | Langseth ................ A63F 13/23 |
| | | 345/419 |
| 2013/0342568 A1 | 12/2013 | Ambrus et al. |
| 2014/0085446 A1 | 3/2014 | Hicks |
| 2014/0168056 A1 * | 6/2014 | Swaminathan ...... G06V 30/142 |
| | | 345/156 |
| 2014/0247273 A1 * | 9/2014 | Rosen ....................... G06T 7/73 |
| | | 345/472 |
| 2014/0361971 A1 * | 12/2014 | Sala ........................ G06F 3/013 |
| | | 345/156 |
| 2015/0082180 A1 | 3/2015 | Ames et al. |
| 2015/0193018 A1 | 7/2015 | Venable et al. |
| 2015/0325008 A1 * | 11/2015 | Scarff ..................... G06T 11/60 |
| | | 345/605 |
| 2015/0332091 A1 * | 11/2015 | Kim ..................... H04N 5/2621 |
| | | 382/103 |
| 2015/0338915 A1 | 11/2015 | Publicover et al. |
| 2016/0025973 A1 | 1/2016 | Guttag et al. |
| 2016/0049009 A1 * | 2/2016 | Hara ........................ G06V 20/20 |
| | | 345/633 |
| 2016/0373660 A1 * | 12/2016 | Saito ..................... H04N 23/675 |
| 2017/0011492 A1 | 1/2017 | Thunström et al. |
| 2017/0053448 A1 | 2/2017 | Kim |
| 2017/0091549 A1 | 3/2017 | Gustafsson et al. |
| 2017/0235362 A1 * | 8/2017 | Thunström ............. G06F 3/013 |
| | | 345/428 |
| 2017/0249862 A1 | 8/2017 | Border |
| 2017/0318235 A1 | 11/2017 | Schneider et al. |
| 2018/0224935 A1 | 8/2018 | Thunström |
| 2018/0249151 A1 | 8/2018 | Freeman et al. |
| 2018/0268738 A1 | 9/2018 | Miller et al. |
| 2019/0094963 A1 | 3/2019 | Nijs |
| 2019/0113970 A1 * | 4/2019 | Nijs ......................... G06T 5/60 |
| 2019/0163267 A1 | 5/2019 | Hainzl et al. |
| 2019/0180483 A1 * | 6/2019 | DeLuca ............... G02B 27/017 |
| 2019/0222817 A1 * | 7/2019 | Abou Shousha ..... G06F 18/214 |
| 2019/0261027 A1 | 8/2019 | Hawke |
| 2019/0346678 A1 * | 11/2019 | Nocham ................. G06F 3/0484 |
| 2019/0385342 A1 * | 12/2019 | Freeman ................. G06T 11/00 |
| 2020/0160057 A1 * | 5/2020 | Roxas ..................... G06F 3/167 |
| 2020/0258278 A1 | 8/2020 | Mirhosseini ............ G06T 7/292 |
| 2020/0412983 A1 * | 12/2020 | Nakata ..................... G06T 7/70 |
| 2022/0027629 A1 * | 1/2022 | Case ..................... G02B 27/0172 |

\* cited by examiner

IMAGE ENHANCEMENT DEVICES WITH GAZE TRACKING

This application is a continuation of U.S. patent application Ser. No. 16/927,796, filed Jul. 13, 2020, which is a continuation of U.S. patent application Ser. No. 16/280,786, filed Feb. 20, 2019, now U.S. Pat. No. 10,747,312, which claims the benefit of U.S. Provisional Patent Application No. 62/643,023, filed Mar. 14, 2018, which are hereby incorporated by reference herein in their entireties.

BACKGROUND

This relates generally to electronic devices and, more particularly, to electronic devices that display mixed reality content.

Mixed reality devices may have cameras and displays. The cameras can capture images of the real world. Content such as text and graphics can then be overlaid on the real-world images to produce mixed-reality images.

It can be challenging to present mixed reality content to a user. The presentation of mixed-reality images to a user may, for example, be disrupted by head and eye movement. Users may have different visual capabilities. If care is not taken, mixed-reality images will be presented that cause disorientation or motion sickness and that make it difficult for a user to identify items of interest.

Summary

An electronic device may have a display and a camera. The camera may be used to capture a real-world image. The real-world image can be displayed on the display for a user.

Control circuitry in the device can gather information on the user's point of gaze using a gaze tracking system and other sensors. The control circuitry can also gather information on the real-world image such as information on content, motion, and other image attributes by analyzing the real-world image. User vision information such as user visual acuity, contrast sensitivity, field of view, and geometrical distortions can be provided to the control circuitry. Input-output circuitry can be used by the control circuitry to gather user input such as user preferences and user mode selection commands and can be used to gather location information and other input Based on the point-of-gaze information and/or other gathered information, the control circuitry can display supplemental information on the real-world image on the display. The supplemental information can include augmentations such as icons, text labels, and other computer-generated text and graphics overlaid on the real world image and can include enhanced image content such as magnified portions of the real-world image. If desired, the real-world image may be globally or locally enhanced by adjusting contrast, altering image color, enhancing edges, adjusting for geometrical vision distortion, and performing other image enhancements on the real-world image.

DETAILED DESCRIPTION

Electronic devices may be provided with displays. The displays may be used in displaying supplemental content overlaid on real-world content. The supplemental content may, for example, include augmentation such as computer-generated text and graphics and may include enhanced image content such as real-world image data that has been modified by adjusting image attributes such as contrast, magnification, and other properties.

An electronic device may use information such as information from a gaze tracking system and other information in displaying image enhancements. As an example, a portion of a real-world image may be magnified for a low vision user only when a user's point of gaze is relatively static to avoid inducing motion sickness effects. An electronic device may analyze a real-world image to identify content of interest (e.g., the location and motion of objects, the identity of faces and other items, the presence of text, the location of the edges of an object, etc.). If desired, information such as a user's eyeglass prescription and other user vision data may be used in displaying image enhancements. For example, text in an image can be magnified if a user is visually impaired (e.g., if a user has low spatial acuity) or image content can be distorted to compensate for geometric distortion created by the user's vision. Image enhancements may be applied globally to a real-world image or may be displayed in appropriate image enhancement regions. If desired, user input and other information can also be used in displaying supplemental information on a real-world image.

Figure 1:
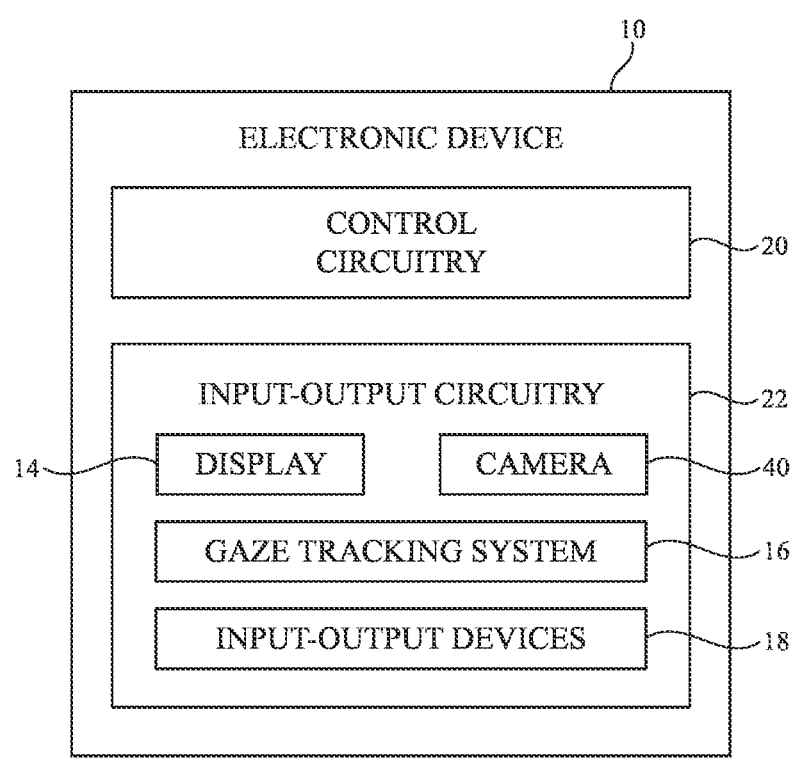
FIG. 1 is a schematic diagram of an illustrative electronic device in accordance with an embodiment.

A schematic diagram of an illustrative electronic device of the type that may be used in presenting a user with mixed reality content is shown in FIG. 1. Electronic device 10 may be a head-mounted device (head-mounted display), a cellular telephone, a tablet computer, a head-up display (e.g., a mixed reality display in an automobile or other vehicle), a laptop or desktop computer, a television, a wrist watch, or other electronic equipment. As shown in FIG. 1, electronic device 10 may have control circuitry 20. Control circuitry 20 may include storage and processing circuitry for controlling the operation of device 10. Circuitry 20 may include storage such as hard disk drive storage, nonvolatile memory (e.g., electrically-programmable-read-only memory configured to form a solid state drive), volatile memory (e.g., static or dynamic random-access-memory), etc. Processing circuitry in control circuitry 20 may be based on one or more microprocessors, microcontrollers, digital signal processors, baseband processors, power management units, audio chips, graphics processing units, application specific integrated circuits, and other integrated circuits. Software code may be stored on storage in circuitry 20 and run on processing circuitry in circuitry 20 to implement control operations for device 10 (e.g., operations associated with capturing real-world images with a camera, data gathering operations, operations involved in monitoring a user's point of gaze, operations involved in generating content overlaid on top of real-world images, operations associated with performing pattern recognition and other image processing operations on real-world images, operations associated with displaying images with real-world content and overlaid content, etc.)

Device 10 may include input-output circuitry 22. Input-output circuitry 22 may be used to allow data to be received by device 10 from external equipment (e.g., a computer or other electrical equipment) and to allow a user to provide device 10 with user input. Input-output circuitry 22 may also be used to gather information on the environment in which device 10 is operating. Output components in circuitry 22 may allow device 10 to provide a user with output and may be used to communicate with external electrical equipment.

As shown in FIG. 1, input-output circuitry 22 may include a camera such as camera 40. Camera 40, which may sometimes be referred to as a front-facing camera, scene camera, or real-world-image camera, may be used in capturing images of the real-world (e.g., the user's environment). The real-world images captured by camera 40 may include content in the user's field of view and content that lies outside of the user's field of view (e.g., portions of the user's environment that lie adjacent to the user's field of view).

Input-output circuitry 22 may also include a display such as display 14. Display 14 may be used to display images for a user of device 10. Display 14 may be an organic light-emitting diode display, a liquid crystal display, a liquid-crystal-on-silicon display, a micromirror array display (e.g., a microelectromechanical systems (MEMS) display, sometimes referred to as a digital micromirror device), or any other suitable display. Display 14 may be mounted in device so that images on display 14 are provided in the user's field of view. In some configurations, display 14 may be supported on a head-mounted support structure (glasses, helmet, hat, goggles, etc.). In other configurations, display 14 may be mounted in a vehicle or other equipment (e.g., in a location in which images may be presented to a user by reflecting image output from the display into the user's field of view from the interior surface of a vehicle window).

Display 14 may lie directly in the user's line of sight or an optical combiner in the user's line of sight may be used to merge images from display 14 with the user's view of the environment surrounding device 10. In some arrangements, display 14 is housed in the housing of a cellular telephone, tablet computer, or other portable electronic device. In general, display 14 may be placed in any suitable location for providing images to a user. During operation, a user may view real-world image content presented with display 14 (e.g., real-world images captured with a camera and displayed on display 14) and/or may view real-world content directly (e.g., when the real world is visible through an optical combiner that is being used in presenting images from display 14 for the user). Illustrative configurations in which users view real-world content on display 14 that is overlaid with supplemental content on display 14 are sometimes described herein as an example.

Input-output circuitry 22 may include a gaze tracking system such as gaze tracking system 16. Gaze tracking (eye monitoring) system 16 may include image sensors, light sources, and/or other equipment that is used in monitoring the eyes of the user. Gaze tracking system 16 may include, for example, one or more visible and/or infrared cameras that face a user's eyes and capture images of the user's eyes. During operation of device 10, control circuitry 20 may use gaze tracking system 16 to track a user's gaze. Cameras and/or other sensors in system 16 may, for example, determine the location of a user's eyes (e.g., the centers of the user's pupils) and may determine the direction in which the user's eyes are oriented (the direction of the user's gaze, sometimes referred to as a measured point of gaze). By processing this information and information on the location of display 14, the location of the user's point of gaze may be determined dynamically. If desired, additional information (e.g., information from an inertial measurement unit containing an accelerometer, compass, and/or gyroscope and/or information from other motion sensors) may be used in determining the location of the user's point of gaze. For example, an inertial measurement unit, a visual odometry sensor in circuitry 22, and/or other sensors can determine the orientation of device 10 and/or a user's head relative to the surrounding environment and can use this information in addition to gaze tracking information to determine the current point of gaze of the user.

User input and other information may also be gathered using sensors and other input devices in input-output devices 18. Input-output devices 18 may include, for example, position and motion sensors (e.g., compasses, gyroscopes, accelerometers, and/or other devices for monitoring the location, orientation, and movement of device 10), may include force sensors, temperature sensors, touch sensors, buttons, capacitive proximity sensors, light-based proximity sensors, other proximity sensors, color ambient light sensors and other ambient light sensors, strain gauges, gas sensors, pressure sensors, moisture sensors, magnetic sensors, gesture sensors, depth sensors (e.g., three-dimensional structured light sensors and other depth sensors), and other sensors, may include audio components such as microphones for gathering voice commands and other audio input, and may include speakers for providing audio output (e.g., for providing sound to the left and right ears of a user). If desired, input-output devices 18 may include haptic output devices (e.g., vibrating components), light-emitting diodes, lasers, and other light sources, and other output components.

Circuitry 22 may include wired and wireless communications circuitry that allows device 10 (e.g., control circuitry 20) to communicate with external equipment (e.g., remote controls, joysticks and other input controllers, portable electronic devices, computers, displays, etc.) and that allows signals to be conveyed between components (circuitry) at different locations in device 10. Global Positioning System (GPS) receiver circuitry and/or other satellite navigation system circuitry in input-output circuitry 22 and/or other location sensor circuitry in circuitry 22 may be used in determining the user's location and/or velocity. Using wireless communications circuitry in circuitry 22, device 10 can gather information over a network such as the internet (e.g., weather information, traffic conditions, etc.)

Figure 2:
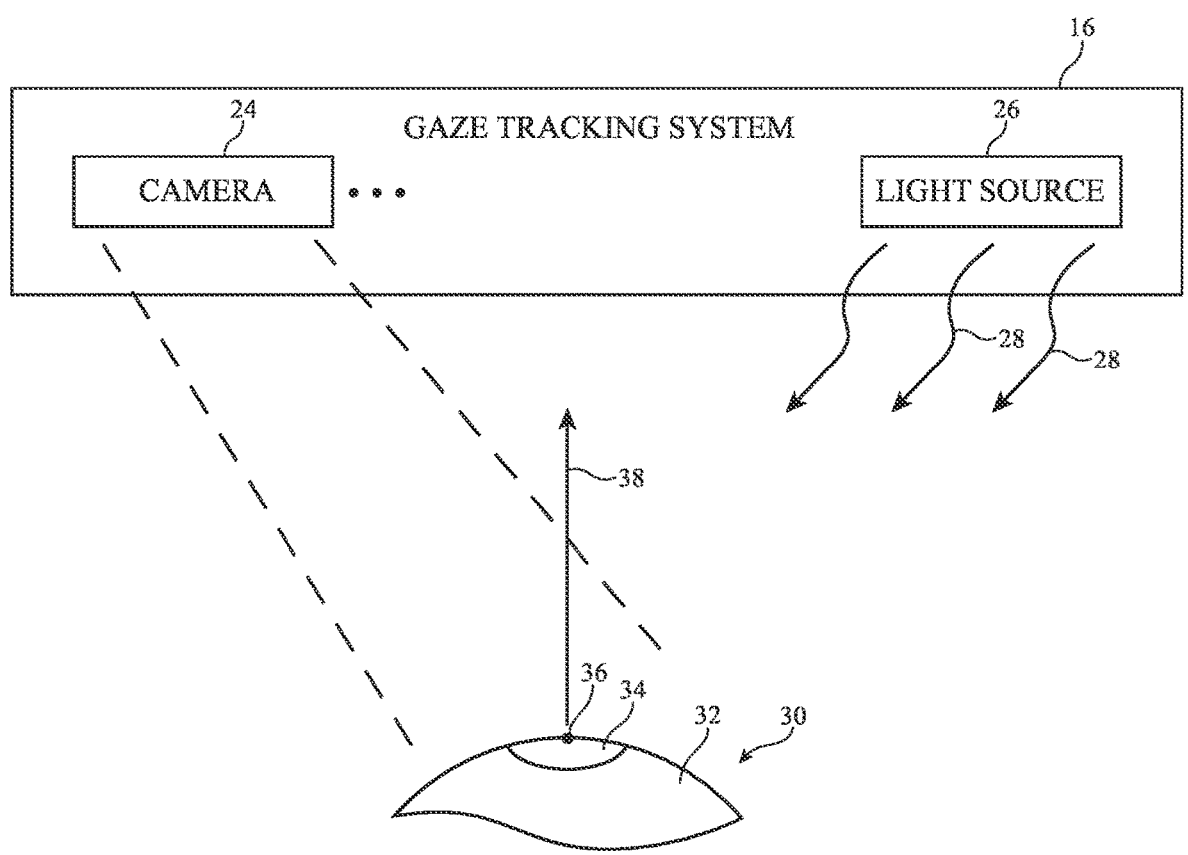
FIG. 2 is a diagram of gaze tracking circuitry in accordance with an embodiment.

FIG. 2 is a diagram showing how gaze tracking system 16 may gather eye position information on a user's eye 30. In a typical scenario, gaze tracking system 16 may include components for simultaneously monitoring two eyes such as eye 30 of FIG. 2.

As shown in FIG. 2, system 16 may include one or more image sensors such as gaze tracking camera(s) 24. Each of cameras 24 may be focused on the front of a user's eye such as eye 30 so that the characteristics of the user's eye can be measured. One or more light-emitting diodes, lasers, lamps, and/or other light-emitting components may be used to form a light source for gaze tracking system 16 (see, e.g., light source 26).

During operation, light source 26 may emit light 28. For example, light source 26 may emit multiple beams of light 28 towards the user's eye 30 (e.g., 2-10 beams of light, 6 beams of light, 4-7 beams of light, 4-9 beams of light, etc.). Light 28 may be reflected off of the surface of eye 30. Camera 24 may gather images of eye 30. Information on the appearance of eye 30 (e.g., iris information, pupil information, blood vessel information, etc.) and/or information on reflected light (e.g., one or more light beams) from cornea 32 and other portions of eye 30 may be used by control circuitry 20 to determine the location of pupil center 36 of pupil 34 and the direction in which the user is currently gazing (gaze direction 38). The eye position information (pupil center information, eye orientation, etc.) that is gathered by gaze tracking system 16, the resulting information determined on the user's gaze direction 38, and information on the location of real-world objects (e.g., items in the environment surrounding device 10) relative to system 16 and eyes 30 may be used by control circuitry 20 to dynamically identify the user's point of gaze within the real-world environment surrounding device 10. Real-world images can then be provided with augmentations and/or enhanced based on the point of gaze (e.g., the location in the real world where the user's gaze lands).

During operation, control circuitry 20 can use camera 40 to capture images of the real world and can use gaze tracking system 16 and other input-output devices 18 to gather user input and information on the user's environment. Data on the user such as the user's glasses prescription and other information on the user (e.g., visual impairment details such as low vision details) can also be gathered. This information can be used by control circuitry 20 in displaying mixed reality content for the user on display 14. For example, text in a real-world image can be magnified to accommodate a low vision user. Contrast and other image attributes can also be adjusted.

If desired, content attributes such as the identities of people in the real-world image can be obtained by control circuitry 20 (e.g., by performing pattern recognition operations). Mixed reality content based on these content attributes can be presented to the user. For example, the names of people in the user's field of view may be presented to the user by overlapping text boxes on a real world image. A text box containing the name of each person in the user's field of view may be placed adjacent to that person or only those people near to the user's point of gaze may be labeled. Point of gaze information may be used in determining which people are being observed by the user.

Point of gaze information (e.g., information on the location and motion of the user's point of gaze) can also be analyzed to determine when supplemental content should be presented based on real-world image content outside of the user's field of view (or only in the user's extreme peripheral vision). For example, if a user's point of gaze is moving to the left, an icon can be presented for the user that indicates that content of interest (e.g., a moving vehicle) lies just to the left of the user's field of view. In this way, a user may be provided with advance notice of objects that are currently not being viewed by the user.

Figure 3:
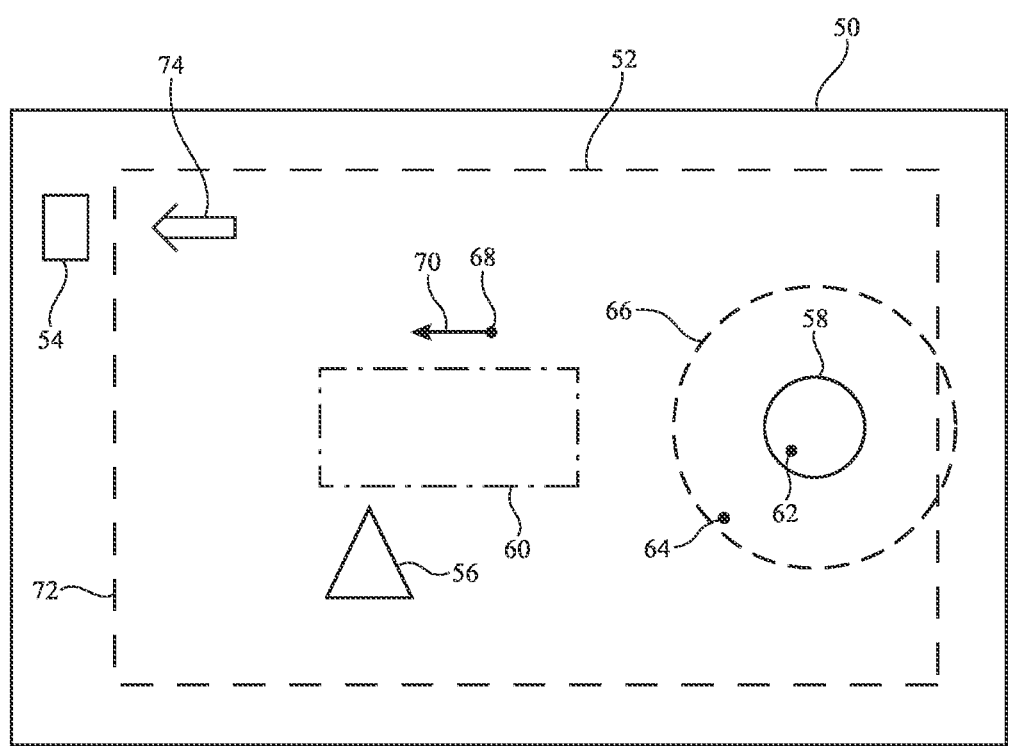
FIG. 3 is a diagram of an illustrative real-world image and supplemental information displayed on the real-world image in accordance with an embodiment.

Consider, as an example, real-world image 50 of FIG. 3. Real-world image 50 may be captured by input-output circuitry 22 using camera 40. If desired, the field of view of camera 40 may be larger than the user's field of view (see, e.g., user's field of view 52). Image 50 may contain real-world objects such as objects 58, 56, and 54 (e.g., people, vehicles, buildings, furniture, landscape elements, etc.). During operation of device 10, mixed reality content may be presented to a user in some or all of the user's field of view. As an example, computer-generated images (still and/or moving image content with labels and other text and/or graphics) and/or portions of real-world image 50 that have been enhanced (e.g., by image processing to adjust magnification, contrast, color, brightness, edge detail, etc.) can be presented in one or more regions such as supplemental image region 60 (sometimes referred to as a supplemental content region, overlay region, etc.).

The information that is presented in region 60 may, as an example, include a portion of real-world image 50 that has been enhanced by image processing. The portion of real-world image 50 that is selected for image enhancement may be selected based on user input and other information. As an example, point-of-gaze information may be used in determining which portion of real-world image 50 is to be magnified or otherwise enhance for display in region 60. If, for example, a user is viewing object 58 and the user's point of gaze overlaps object 58 (see, e.g., point-of-gaze 62), a portion of real-world image 50 that is associated with some or all of object 58 may be enhanced (e.g., enlarged, provided with additional contrast, etc.) and the resulting enhanced image can be displayed in region 60. If desired, some or all of the portion of the image covering object 58 may be enhanced when the user's point of gaze does not overlap object 58, but instead lies within a predetermined distance of object 58. For example, control circuitry 20 can display enhanced image content in response to detecting that the user's point of gaze lies within area 66 adjacent to object 62 (see, e.g., point of gaze 64).

In determining when a user's point of gaze overlaps a desired object or an area near the desired object, control circuitry 20 can evaluate how long the user's gaze dwells at different locations in the image. A threshold point-of-gaze dwell time or other suitable criteria can be applied to point-of-gaze information to determine whether the user's point of gaze has dwelled in a particular location sufficiently long to trigger the display of content in region 60. As an example, a magnified version of object 62 may be presented in region 60 in response to detecting that the user's point of gaze has dwelled within region 66 for more than at least 0.2 s, at least 0.5 s, at least 1 s, at least 2 s, at least 4 s, at least 10 s, less than 8 s, less than 5 s, or other suitable time.

In some configurations, control circuitry 20 monitors movement in the user's point of gaze and takes action based on point-of-gaze movement. If, in the example of FIG. 3, the user's point of gaze 68 is moving in direction 70 towards left edge 72 of the user's field of view 52 (e.g., with a speed of movement that exceeds a predetermined threshold speed for more than a predetermined threshold amount of time), control circuitry 20 can analyze image 50 for objects of interest that lie outside of field of view 52 (e.g., items located beyond left edge 72 such as object 54). Pattern recognition operations may be performed on image 50 to determine which elements of image 50 correspond to objects of interest. For example, image 50 may be processed by control circuitry 20 to identify vehicles, people, objects moving more than a particular speed, objects having a brightness that exceeds a predetermined brightness threshold, objects of a particular color, objects containing text, etc. In response to determining that the user's point of gaze 68 is moving in direction 70 and that an item of interest in image 50 such as object 54 lies in direction 70 outside of the user's current field of view 52, associated supplemental information can be presented for the user. For example, control circuitry 20 can display a graphical element such as arrow 74 that points toward out-of-view objects such as object 54. This directs the user's attention to potentially important objects that are just beyond the user's field of view and helps the user be alert to such objects. If, as an example, a user is driving a vehicle or is walking along a street, it may be helpful to be informed that object 54 (e.g., a fast-moving vehicle) is present. In some arrangements, disorientation and motion sickness can be avoided by suppressing the display of magnified text or other supplemental content in response to detecting motion in the user's point of gaze (e.g., eye saccades).

Any suitable criteria may be used to determine when control circuitry 20 should display supplemental information on real-world images (e.g., overlaid content such as enhanced image content in region 60 and/or text or graphics such as arrow 74, a text label, a warning, etc.). As an example, control circuitry 20 can determine the location of the user's point of gaze and the movement of the user's point of gaze by processing point of gaze location information from gaze tracking system 16 and information on the orientation of the user's head from a position and motion sensor (orientation sensor) such as an inertial measurement unit and/or visual odometry system. If the location and/or motion of the point of gaze meets predetermined criteria (e.g., if the point of gaze dwells in a particular location for more than a predetermined amount of time, if the point of gaze moves at particular speeds and/or directions), appropriate supplemental information can be displayed. As another example, supplemental information can be displayed based on information such as the location of device 10 (e.g., the location of device 10 determined by a satellite navigation system receiver and/or other location sensor in input-output devices 18), sensor information (e.g., information on ambient lighting conditions indicating whether it is day or night), based on content in image 50 (e.g., whether faces are present and/or whether faces that are present correspond to particular individuals, whether image 50 contains particular objects, is characterized by a predetermined amount of motion, has particular brightness levels or contains particular colors or patterns, etc.), and/or based on other information. The display of supplemental information can also be suppressed (e.g., temporarily) whenever certain criteria are satisfied (e.g., excessive motion in the user's point of gaze, etc.).

If desired, a user of device 10 can press a button, speak a voice command, place the user's gaze direction in a particular orientation (e.g., gazing downward to invoke automatic bifocals, gazing towards the upper right, gazing so that the user's point of gaze overlaps a displayed interactive icon, etc.), blink (e.g., three times in rapid succession so that camera 24 or other sensors can detect a predetermined blink command), or can otherwise take an action that directs control circuitry 20 to display the supplemental information.

The conditions determining whether supplemental information is displayed and the type of supplemental information that is presented (e.g., magnified image content, image content with enhanced contrast, etc.) can include user data such as the user's eyeglass prescription and other visual function information. As an example, the user's vision can be characterized using ophthalmic instruments (e.g., to characterize the user's field of view, visual acuity, contrast sensitivity, and geometrical distortions). This information can then be used in determining whether, as an example, image content should be enhanced by increasing contrast or by increasing magnification (or both). In some situations (e.g., when the user's point of gaze is moving), motion sickness may be induced if magnified content is presented. Accordingly, the presentation of supplemental information such as enhanced image information in region 60 may be suppressed when more than a predetermined amount of point of gaze motion is detected or other suitable supplemental information suppression criteria are satisfied.

Figure 4:
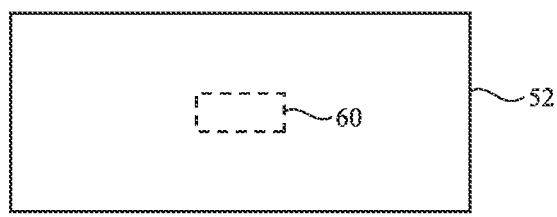
FIGS. 4, 5, and 6 are diagrams showing illustrative image enhancement zones on a display in accordance with an embodiment.
Figure 5:
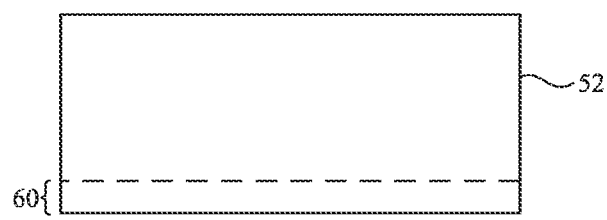
Figure 6:

Supplemental information (e.g., computer-generated text or graphics or other augmentation information and/or enhanced image content) may be displayed in any suitable portion of the user's field of view. As examples, supplemental information may be displayed in region 60 of FIG. 4 (e.g., in the middle of the displayed image), in region 60 of FIG. 5 (e.g., along an edge of the displayed image such as along the bottom edge of the displayed image), in region 60 of FIG. 6 (e.g., in the upper right corner of the displayed image or other corner of the displayed image), and/or in other suitable portion(s) of the image being displayed by display 14.

Figure 7:
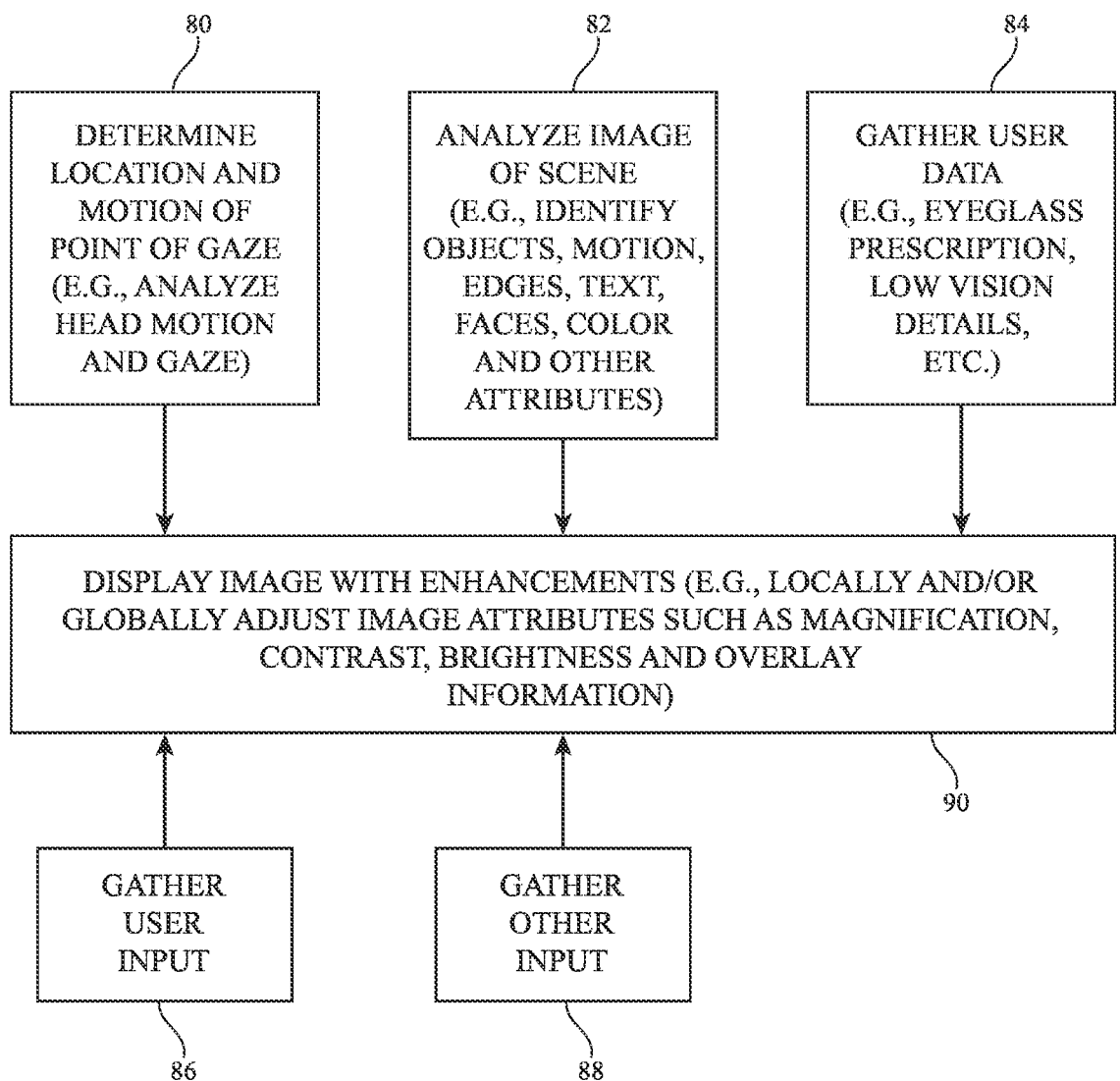
FIG. 7 is a flow chart of illustrative operations involved in providing a user with mixed reality content in accordance with an embodiment.

A flow chart of illustrative operations involved in using device 10 to provide a user with real-world images and supplemental information on display 14 is shown in FIG. 7.

During the operations of block 80, control circuitry 20 may use input-output circuitry 22 to gather information on the user's gaze. Gaze tracking system 16 and an inertial measurement unit and/or other sensors in input-output devices 18 may be used to monitor eye movement and optionally other input such as head movement/orientation and/or information on the orientation of device 10 and thereby measure the user's point of gaze. Information on the user's point of gaze such as point of gaze location and/or point of gaze movement can be analyzed to determine if a user is providing intentional input (gazing at a predetermined region of the displayed image for a predetermined time to intentionally invoke the display of supplemental information) and/or can be analyzed to determine whether the user is viewing a particular item of interest or is moving toward a particular item of interest (as examples). The operations of block 80 may include characterizing the user's eye motion as being fixated (not moving), saccade (moving), and blink.

During the operations of block 82, control circuitry 20 can analyze captured images such as image 50. For example, images of the scene the user is viewing (e.g., real world image 50) can be processed using image recognition algorithms and other processing algorithms to identify content in the image and other attributes. As an example, the image can be processed to identify image attributes such as brightness, color breakdown, contrast, etc. Patterns can be detected (e.g., to identify vehicles, roads, people, faces, the identities of people associated with particular faces, road signs with and without text, text on billboards and other advertising, and/or other items in the user's environment). Object edges can be detected using edge detection processes. Objects at rest and objects in motion can be categorized. All information in image 50 can be processed using techniques such as these or, if desired, subsets of the information in image 50 can be processed. As an example, image processing such as facial recognition processing can be performed for those faces that a user's point of gaze dwells on, but can be skipped for other faces to reduce processing load. The processing of this information can also be influenced by other sensor output. For example, road signs information can be processed and identified for magnification only when the user and device 10 are moving faster than a predetermined speed (indicating that the user is driving).

During the operations of block 84, information on the vision and other attributes of the user can be gathered. For example, user data such as visual impairment information can be gathered using ophthalmologic instruments and provided to control circuitry 20 (e.g., over a wired and/or wireless communications path, using user input devices, etc.). By characterizing the user's acuity, contrast sensitivity, field of view, geometrical distortions and other vision attributes, appropriately targeted image enhancements and augmentations can be provided for the user.

During the operations of block 86, user input can be gathered using input-output circuitry 22. For example, gaze tracking system 16 may gather intentional eye input such as eye blinks and intentional point-of-gaze input (e.g., eye gestures such as gestures involving movement of the point of gaze of the user in and out of a particular region or intentional direction of the user's gaze downward to automatically invoke a magnified strip of image 50 serving as digital bifocals, etc.). Circuitry 22 may also use buttons, touch sensors, microphones, and other input-output circuitry to gather user input. User input may be used to place device 10 in different operations modes (e.g., walking mode in which supplemental information is provided in the center of a displayed image, a driving mode in which supplemental information is provided along an edge of the display image, a meeting mode in which facial recognition operations are used to identify and label participates of a meeting, an inactive mode in which no supplemental information is displayed, etc.). User input may also be used to supply device 10 with preferences (e.g., user adjustable settings such as preferred display brightness level, threshold values, magnification settings, a desired location for supplemental information region 60, etc.).

Additional input may be gathered with input-output circuitry 22 during the operations of block 88. For example, control circuitry 20 may use circuitry 22 to gather location information, information on the speed and direction of motion of device 10, information on traffic conditions, information on local weather, etc.

During the operations of block 90, control circuitry 20 may display the captured image from camera 40 on display 14 for viewing by the user (and/or the user can view the real world through an optical combiner such as a vehicle window or an optical combiner in a head-mounted device). Supplemental information can be displayed on display 14 so as to overlap the real world content. For example, information can be displayed over some or all of display 14 that includes augmented vision information such as graphics, text, and other computer-generated overlays and/or that includes enhanced vision information such as all or some of image 50 that has been processed to adjust contrast, to adjust brightness, to adjust color, to adjust object features such as to enhance edges by applying edge enhancement, to adjust magnification, to adjust geometric distortion, or to adjust other image attributes. User data gathered during the operations of block 84 (e.g., a user's visual impairment details) may be taken into account during the operations of block 90. For example, if the user's vision is characterized by a geometric distortion, a compensating geometric distortion can be applied in displaying the image on display 14. If the user has low visual spatial acuity, content can be magnified appropriately.

In general, supplemental information can be displayed based on the information gathered during block 80 (e.g., point of gaze information), image analysis performed during block 82, information gathered during block 84, information gathered during block 86 (e.g., mode selection information and other information supplied as user input), and/or information gathered during the operations of block 88 (e.g., information on the current weather, traffic conditions, etc.). Image adjustments can be made locally (e.g., to magnify text in an appropriate region such as regions 60 of FIGS. 4, 5, and 6) or may be applied globally (e.g., by enhancing contrast for all of the displayed image when it is determined that the user's vision is characterized by low contrast).

The foregoing is merely illustrative and various modifications can be made to the described embodiments. The foregoing embodiments may be implemented individually or in any combination.

What is claimed is:

1. An electronic device, comprising:
a camera configured to capture an image of the real world;
a display configured to display the image of the real world;
a gaze tracking system configured to gather point-of-gaze information; and
control circuitry configured to display supplemental content on the display based on the point-of-gaze information, wherein the supplemental content comprises a modified portion of the image of the real world and wherein the control circuitry is configured to display the modified portion of the image of the real world as an overlay on the image of the real world.

2. The electronic device defined in claim 1 wherein the modified portion comprises a magnified portion of the image of the real world.

3. The electronic device defined in claim 1 wherein the modified portion comprises an enhanced contrast portion of the image of the real world.

4. The electronic device defined in claim 1 wherein the modified portion comprises a brighter portion of the image of the real world.

5. The electronic device defined in claim 1 wherein the modified portion comprises a portion of the image of the real world that has been processed to adjust geometric distortion.

6. The electronic device defined in claim 1 wherein the modified portion comprises a portion of the image of the real world that has been processed to enhance edges.

7. The electronic device defined in claim 1 wherein the control circuitry is configured to analyze the image to identify objects in motion.

8. The electronic device defined in claim 1 wherein the control circuitry is configured to provide the supplemental content based on a point-of-gaze dwell time associated with the point of gaze information, attributes in the image, and user input.

9. The electronic device defined in claim 1 further comprising a motion sensor, wherein the control circuitry is configured to display the supplemental content in response to determining that a speed measured by the motion sensor exceeds a predetermined limit.

10. The electronic device defined in claim 1 further comprising location sensing circuitry, wherein the control circuitry is configured to display the supplemental content based on a geographic location identified with the location sensing circuitry.

11. An electronic device, comprising:
a camera configured to capture an image of the real world;
a display configured to display the image of the real world;
a gaze tracking system configured to gather point-of-gaze information; and
control circuitry configured to display magnified supplemental content on the display based on the point-of-gaze information and as an overlay on a region of the image of the real world.

12. The electronic device defined in claim 11 wherein the control circuitry is configured to analyze the image to identify text and wherein the magnified supplemental content includes a magnified version of the text.

13. The electronic device defined in claim 11 wherein the control circuitry is configured to display an augmentation including computer-generated graphic content based on the point-of-gaze information.

14. The electronic device defined in claim 11 wherein the region is characterized by a location within the image of the real world and wherein the electronic device comprises input-output circuitry configured to gather user input to adjust the location.

15. The electronic device defined in claim 11 wherein the control circuitry is configured to display the magnified supplemental content in response to a point-of-gaze gesture.

16. The electronic device defined in claim 11 wherein the control circuitry is configured to display the magnified supplemental content in response to user eye blink input gathered with the gaze tracking system.

17. The electronic device defined in claim 11 wherein the control circuitry is configured to display the magnified supplemental content in response to determining, from the point of gaze information, that a point of gaze has dwelled on a particular location for more than a predetermined dwell time.

18. The electronic device defined in claim 11 further comprising a motion sensor, wherein the control circuitry is configured to display the magnified supplemental content in response to determining that a speed measured by the motion sensor exceeds a predetermined limit.

19. The electronic device defined in claim 11, further comprising:
   location sensing circuitry, wherein the control circuitry is configured to display the magnified supplemental content based on a geographic location identified with the location sensing circuitry.

20. An electronic device, comprising:
   a camera configured to capture an image of the real world;
   a display configured to display the image of the real world;
   location sensing circuitry;
   a gaze tracking system configured to gather point-of-gaze information; and
   control circuitry that is configured to display magnified supplemental content on the image of the real world based on the point-of-gaze information and based on a geographic location identified with the location sensing circuitry.

* * * * *